3,308,065
SCALE REMOVAL, FERROUS METAL PASSIVATION AND COMPOSITIONS THEREFOR
Chester A. Lesinski, Bay City, Mich., assignor to The Dow Chemical Company, Midland, Mich., a corporation of Delaware
No Drawing. Filed July 22, 1963, Ser. No. 296,464
7 Claims. (Cl. 252—82)

This application is a continuation-in-part of U.S. Patent application Serial No. 211,885, filed June 23, 1962, now abandoned.

This invention concerns a method for removing scale from metal surfaces, for passivating ferrous metal surfaces and compositions useful therefor.

In almost any type of metal equipment in which water is evaporated or heat transfer occurs, insoluble salts deposit on the surfaces to form scale. Usually the deposits consist of calcium and magnesium salts and result from the use of hard water, although sometimes the scale is based on elements other than calcium or magnesium.

Common types of scale which deposit on metal surfaces include calcium sulfate (gypsum), calcium carbonate (limestone), complex calcium phosphate (hydroxy apatite) and calcium oxalate. In addition, scales containing a high iron content are also encountered.

It has previously been known to use inorganic or organic acids to remove scale deposits from ferrous metal heat exchange equipment. After descaling, the equipment is normally drained of the acidic solvent, flushed with water and residual acid, neutralized with an alkaline solution, drained again and finally flushed with water.

Alkali metal salts of alkylenepolyamine polyacetic acids (hereafter APAPA), prototype ethylenediamine tetraacetic acid (EDTA), have also been used to remove scale from ferrous metal surfaces. They are ineffective, however, for removing iron oxide deposits at a pH above 8.

When aqueous acids or aqueous solutions of alkali metal salts of APAPA having a pH below 8 are used, the resulting cleaned ferrous metal surfaces are prone to oxidation or rusting, and the build-up of scale is again under way.

In accordance with the process of the present invention, scale and particularly iron oxide containing scale is removed from metal surfaces by a contacting treatment with an aqueous, alkaline, saline solution. As an essential feature, the solution employed contains at least one ammonium, amine or hydroxy alkylamine salt of nitrilotriacetic acid (NTA), N-2-hydroxyethylamino diacetic acid (OHEtIDA), an alkylenepolyamine polycarboxylic acid or mixture thereof. The contacting treatment is preferably carried out at a temperature ranging between 20° C. up to the temperature at which the salt decomposes. It is generally desirable to rinse the salt solution from the cleaned metal surface with water.

In the process of the invention, the salt may conveniently be formed in place by admixing the base and the acid in the presence of the scale covered metal surfaces in a proportion to provide an alkaline solution which preferably has a pH value of at least 8. It is desirable for the alkaline, saline solution to contain from 0.1 to 28.6 weight percent of the salt.

The more preferred salts of the process of the invention are the salts of alkylenepolyamine polycarboxylic acids of the formula $(HOOCCH_2)_2N[(CH_2)_nNCH_2COOH]_mCH_2COOH$ wherein $n$ and $m$ may each independently be 1, 2, 3 or 4, up to $m$ of the carboxymethyl groups may be replaced with β-hydroxyethyl groups, and one or more of the carboxymethyl groups may be replaced by carboxyethyl groups.

The process of this invention, moreover, not only cleans metallic surfaces, but also passivates ferrous metal surfaces thereby due to the formation thereon of a fine, continuous, adherent film of magnetic iron oxide, $Fe_3O_4$, so that subsequent oxidation is substantially reduced. This passivation, moreover, may be effected on substantially clean or new ferrous metal surfaces or those having at most a thin film of mill scale thereon.

As previously indicated, the effective salts of the process of the invention are ammonium, amine or hydroxyalkylamine salts of such chelant acids as nitrilotriacetic, N-2-hydroxyethylimino diacetic and alkylenepolyamine polycarboxylic acids. The preferred amine and hydroxyalkylamine salts of the invention are prepared from water-soluble amines having not more than 5 carbon atoms. These include methylamino-, dimethylamino-, ethylamino-, diethylamino-, methyl ethylamino-, propylamino-, isopropylamino-, trimethylamino-, the isomeric butylamino-, the isomeric amylamino- the corresponding mono(alkanol)-, di(alkanol)-, tri(alkanol)amino- particularly the mono(ethanol)amino-, di(ethanol)amino- and tri(ethanol)amino- salts.

Representative of the ammoniated or aminated chelants set forth broadly above are those of ethylenediamine tetraacetic acid, diethylenetriamine pentaacetic acid, N-2-hydroxyethyl ethylenediamine triacetic acid, propylene-1,2-diamine tetraacetic acid, propylene-1,3-diamine tetraacetic acid, the isomeric butylenediamine tetraacetic acids, etc. When the chelants set forth above are ammoniated or aminated toa pH of 8 to 11, an average of one of the —$CH_2CO_2H$ groups remains in the acid form since the bases used are not basic enough to form a fully substituted ammonium or amino salt of such chelants. In the formula given for such chelants, $n$ is preferably an integer ranging between 1 or 2, although, theoretically, it has no upper limit.

The aqueous solutions of such ammoniated or aminated chelants, when adjusted to a pH of 8 to 11 with ammonia or amine, are effective in weight concentrations of at least 0.1 percent, water basis, and up to their maximum solubility limit. The upper limit is essentially economic. The most generally useful upper limit is about 40 weight percent.

In use, the scale covered metal is contacted with such an aqueous solution for a time sufficient to remove the scale. The rate of scale removal is increased by increasing the temperature of the chelant salt solution from room temperature, ca. 20° C., up to its boiling point. The rate of solution of scale is further increased by heating under superatmospheric pressure up to a temperature just short of the decomposition temperature of said salt. It has been found advantageous to add one or more compatible metal corrosion inhibitors (e.g., mercaptobenzothiazole, polyhydric phenolates and non-reactive derivatives thereof such as gallic acid sodium and ammonium salts, etc.) to the above-described salt solutions in amount ranging between about 0.1 and 5 percent by weight, water basis.

Preparation of the descaling and passivating solutions is as follows. An APAPA, AHEtIDA, NTA or CA, e.g., EDTA, is slurried or mixed at room temperature or above with water and sufficient ammonia, amine, hydroxyalkylamine or combinations thereof to solubilize or dissolve the chelant and to adjust the pH of the resulting solution to between 8 and 11, preferably 9. The ammonia may be added as gaseous ammonia or as aqueous concentrated ammonium hydroxide.

In use the solution, as prepared above, in amount usually at least sufficient on a stoichiometric basis to dissolve hardness and iron oxide deposits is introduced into a fabricated metal apparatus to be cleaned and/or passivated and is allowed to stand with or without agitation until the surface is substantially clean. The amount of cleaning and/or passivating solution to be used is determined by an estimate of the amount of deposit to be removed. It is advantageous to use excess solution, the amount of excess being governed by economics. Advantageously, heating to boiling at atmospheric or superatmospheric pressure is used to accelerate the descaling process. An inhibitor in amount as specified above is advantageously present in solution.

The following examples describe completely representative embodiments and the best mode contemplated by the inventor of practicing the invention.

*Example 1*

A solution of about 2 weight percent of ammoniated EDTA is prepared by adding 2 parts of EDTA to 100 parts of water and mixing with concentrated ammonium hydroxide in amount sufficient to solubilize the EDTA and to give a pH of about 9. The triammonium salt of EDTA is thereby formed. The solution so prepared readily dissolves hardness deposits and iron oxide from hot water boilers when the stoichiometric amount is allowed to stand therein for 3 to 4 hours at boiling temperature. The solution is then drained off and the boiler is washed free of solution with water. A thin passivating film of $Fe_3O_4$ is left behind on the surfaces thereof.

*Example 2*

A solution was prepared by mixing a slurry of 100 ml. of 5 weight percent EDTA in water with concentrated ammonium hydroxide in amount sufficient to give a solution having a pH of 9. When the solution was boiled for 3 hours with 1.00 g. of $Fe_3O_4$, 0.98 g. or 98 percent of the $Fe_3O_4$ was dissolved.

The preceding procedure when repeated with the same quantity of EDTA slurry but dissolved with NaOH in amount to give a pH of 9 dissolved only 0.05 g. (5 percent) of $Fe_3O_4$ when boiled for 3 hours with 1.00 g. of $Fe_3O_4$.

*Example 3*

The procedure of Example 2 was repeated substituting 1.00 g. of $Fe_2O_3$ in place of $Fe_3O_4$. In the first instance, using ammoniated EDTA, 0.96 g. (96 percent) of the $Fe_2O_3$ was dissolved as compared with 0.06 g. (6 percent) with $Fe_2O_3$ when the sodium salt and NaOH were substituted for the ammoniated solution previously used.

*Example 4*

Right-angled carbon steel coupons 1″ x 1″ x 3″ (2.5 x 2.5 x 7.6 cm.) length having a thin film of magnetic iron oxide (mill scale) on the surface were exposed for 16 hours at 149° C. in aqueous 10 percent by weight solutions of the chelants shown below, the pH of which was adjusted to 9 with ammonium hydroxide prior to placing the oxide-coated specimens therein. After the exposure period, the coupons were washed with tap water and examined for effectiveness of mill scale removal as follows:

TABLE I

| Test No. | Chelant | Mill Scale Removal, Percent |
| --- | --- | --- |
| 1 | EDTA | 100 |
| 2 | NTA | 100 |
| 3 | OHEtIDA | 85 |
| 4 | (1) | 100 |
| 5 | (2) | 100 |

[1] N-2-Hydroxyethyl ethylenediamine triacetic acid.
[2] Diethylenetriamine pentaacetic acid.

*Example 5*

Angle iron strips, 1″ x 1″ x 3″ length (2.5 x 2.5 x 7.6 cm.) having mill scale ($Fe_3O_4$) on the surface were used as test specimens. These were treated with various solutions to remove the mill scale, as shown below. They were further treated, as shown below, with other solutions, some for rinsing, some for neutralization and some for passivation, which in some cases, (1, 2, 3 and 4 below) conform to regularly accepted practice in chemical cleaning operations.

TABLE II

| Test No. | Mill Scale Removal in— | Water Rinses | Neutralize 1% Soda Ash | Passivating Solution |
| --- | --- | --- | --- | --- |
| 1 | Aqueous 5% HCl with 0.1% commercial acid inhibitor. | 2 | Yes | 0.5% sodium nitrite, 0.25% monosodium phosphate, 0.25% disodium phosphate. |
| 2 | do | 1 | No | 1% diammonium citrate. |
| 3 | do | 2 | Yes | 1% sodium nitrite. |
| 4 | 3% citric acid, 0.2% commercial acid inhibitor. | 2 | Yes | 0.25% monosodium phosphate, 0.25% disodium phosphate, 0.5% sodium nitrite. |
| 5 | EDTA+$NH_4OH$, pH 9 | 0 | No | None. |
| 6 | EDTA+$NH_4OH$, pH 9 | 1 | No | Do. |
| 7 | EDTA+$NH_4OH$, pH 9 | 2 | No | Do. |

One set of the coupons prepared as above was placed outside on the roof of the laboratory. During a weekend exposure of 60 hours, it rained on the specimens once. The following visual evaluation was made of the specimens after exposure to an industrial atmosphere.

TABLE III

| Specimen Prepared Per Test No. | Percent Total Surface Area Rusted | Examination and Results |
| --- | --- | --- |
| 1 | >95 | Yellow rust on both sides. |
| 2 | >95 | Yellow rust on both sides less than 1. |
| 3 | >95 | Yellow rust on both sides. |
| 4 | >95 | Do. |
| 5 | 5 | Little or no rust, metal dull gray. |
| 6 | ca. 25 | No rust on one side, half of other side rusted. |
| 7 | ca. 25 | Do. |

Another set of specimens was placed in a humidity cabinet at 140° F. (60° C.). The atmosphere within the cabinet was saturated with water vapor at this temperature. Exposure time was 24 hours, after which time the specimens were evaluated. All of the specimens showed after-rust formation with the exception of the coupon prepared per Test No. 5. This coupon did not rust and the metal surface was a dull gray.

*Example 6*

Six specimens of cold rolled carbon steel strip 3″ x 1″ x ⅛″ (7.6 x 2.5 x 0.3 cm.) were exposed for times up to 300 hours at 300° F. (149° C.) in 10 percent aqueous EDTA adjusted to a pH of 9 with ammonium hydroxide, then rinsed off with tap water. After exposure, the specimens had a gun metal blue surface film. This film resisted staining and after-rusting from frequent handling. Fingerprints are known to be offensive in this respect, yet frequent handling by different persons did not result in after-rusting over a period of 60 days. The film was removed by scraping from one of the specimens. Its analysis by X-ray diffraction showed only $Fe_3O_4$, a desirable film-forming constituent for industrial passivation.

What is claimed is:

1. A process for removing (1) hardness scale and one or more iron oxide-containing deposits of the group of $Fe_2O_3$-containing and $Fe_3O_4$ containing deposits or (2) one or more iron oxide-containing deposits of the group of $Fe_2O_3$-cotaining and $Fe_3O_4$-containing deposits from a metal surface containing one or more of the aforesaid hardness scale and iron oxide-containing deposits by conatcting said metal surface with an aqueous alkaline saline solution having a pH of 8 to 11, the active ingredient of which consists of at least one salt of the group consisting of ammonium, amine and hydroxyalkylamine salts of nitrilotriacetic acid, N-2-hydroxyethyliminodiacetic acid, alkylenepolyamine polycarboxylic acids, said amine and hydroxyalkylamine having substitutent groups, each of which has up to 5 carbon atoms, for a time sufficient to dissolve said hardness scale and said iron oxide-containing deposits.

2. A process as claimed in claim 1 wherein the contacting treatment is carried out at a temperature up to the temperature at which the salt decomposes.

3. A process as claimed in claim 1 wherein the salt solution is rinsed from the cleaned metal surface with water.

4. A process as claimed in claim 1 wherein the salt is formed in situ by admixing the base and the acid which react to form said salt in the presence of said metal surface in a proportion to provide an alkaline solution.

5. A process as claimed in claim 1 wherein the alkaline saline solution employed contains from 0.1 to 28.6 weight percent of the salt.

6. A process as claimed in claim 1 wherein the alkylenepolyamine polycarboxylic acid salt of the alkaline saline solution employed is a salt of an acid of the formula $$(HOOCCH_2)_2N[(CH_2)_nNCH_2COOH]_mCH_2COOH$$

wherein $n$ is 1 to 4, $m$ is 1 to 4, up to $m$ of the carboxymethyl groups may be replaced by β-hydroxyethyl groups and at least one of the carboxymethyl groups may be replaced by a carboxyethyl group.

7. A process for passivating a ferrous metal surface by contacting said metal surface with an aqueous alkaline saline solution wherein the solution employed contains as an essential constituent at least one salt of the group consisting of ammonium, amine and hydroxyalkylamine salts of nitrilotriacetic acid, N-2-hydroxyethyliminodiacetic acid and, alkylenepolyamine polycarboxylic acids, said amine and hydroxyalkylamine having substituent groups, each of which has up to 5 carbon atoms, for a time sufficient to form a thin, continuous, adherent film of magnetic iron oxide, whereby said ferrous metal surface is rendered resistant to further oxidation.

References Cited by the Examiner

UNITED STATES PATENTS

| | | | |
|---|---|---|---|
| 1,523,741 | 1/1925 | Yonkman | 252—82 |
| 2,264,103 | 11/1941 | Tucker | 252—180 X |
| 2,396,938 | 3/1946 | Bersworth | 252—80 X |
| 2,544,649 | 3/1951 | Bersworth | 252—180 X |
| 2,802,788 | 8/1957 | Flaxman | 252—181 X |
| 3,099,521 | 7/1963 | Arensberg | 252—175 X |

OTHER REFERENCES

"Sequestrene," Geigy Industrial Chemicals (1952) pp. 2, 3, 27 and 50.

LEON D. ROSDOL, *Primary Examiner.*

JULIUS GREENWALD, *Examiner.*

W. E. SCHULZ, S. E. DARDEN,
*Assistant Examiners.*